United States Patent
Park et al.

(10) Patent No.: US 9,890,921 B2
(45) Date of Patent: Feb. 13, 2018

(54) OPTICAL ELEMENT AND BACKLIGHT UNIT INCLUDING THE SAME

(71) Applicant: LG INNOTEK CO., LTD., Seoul (KR)

(72) Inventors: Sang Jun Park, Seoul (KR); Chang Hyuck Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 74 days.

(21) Appl. No.: 14/681,322

(22) Filed: Apr. 8, 2015

(65) Prior Publication Data
US 2015/0292708 A1    Oct. 15, 2015

(30) Foreign Application Priority Data
Apr. 10, 2014  (KR) .................. 10-2014-0043068

(51) Int. Cl.
| | |
|---|---|
| *F21V 5/00* | (2015.01) |
| *G02B 5/02* | (2006.01) |
| *G02B 19/00* | (2006.01) |
| *F21V 7/22* | (2018.01) |
| *F21V 9/00* | (2018.01) |
| *G02F 1/1335* | (2006.01) |
| *F21Y 115/10* | (2016.01) |

(52) U.S. Cl.
CPC .............. *F21V 5/007* (2013.01); *F21V 7/22* (2013.01); *F21V 9/00* (2013.01); *G02B 5/0231* (2013.01); *G02B 5/0263* (2013.01); *G02B 19/0028* (2013.01); *G02F 1/133603* (2013.01); *G02F 1/133605* (2013.01); *G02F 1/133606* (2013.01); *F21Y 2115/10* (2016.08); *G02F 2001/133607* (2013.01)

(58) Field of Classification Search
CPC ... G02F 2001/133607; G02F 1/133606; G02F 1/133605; G02F 1/133602; G02F 1/133603; G02F 1/133604; G02F 1/133608; G02F 1/133609; G02F 1/133611; G02F 1/133612; G02F 1/133613; F21V 5/007
USPC .......................... 362/244, 326, 331
See application file for complete search history.

(56) References Cited

U.S. PATENT DOCUMENTS

2008/0106902 A1*  5/2008  Peng ................. G02F 1/133603
                                                    362/299
2009/0296017 A1   12/2009  Itoh et al.
(Continued)

FOREIGN PATENT DOCUMENTS

| KR | 10-2010-0010524 A | 2/2010 |
| KR | 10-2013-0019900 A | 2/2013 |

OTHER PUBLICATIONS

European Search Report dated Aug. 21, 2015 in European Application No. 15163046.4.

*Primary Examiner* — Sean Gramling
*Assistant Examiner* — Gerald J Sufleta, II
(74) *Attorney, Agent, or Firm* — Saliwanchik, Lloyd & Eisenschenk (57) ABSTRACT

Provided are an optical element and a backlight unit including the same. The optical element includes a light transmitting substrate including one face and the other face, a plurality of reflective lenses formed to protrude from the one face of the light transmitting substrate, and a scattering pattern which is formed on the one face of the light transmitting substrate and in an area between the plurality of reflective lenses.

10 Claims, 6 Drawing Sheets

(56) References Cited

U.S. PATENT DOCUMENTS

| | | | |
|---|---|---|---|
| 2012/0250350 A1* | 10/2012 | Kim | G02F 1/133606 |
| | | | 362/606 |
| 2012/0307180 A1* | 12/2012 | Wang | G02B 5/0215 |
| | | | 349/64 |
| 2013/0088857 A1 | 4/2013 | Lee et al. | |
| 2014/0226311 A1* | 8/2014 | Ono | F21V 5/04 |
| | | | 362/97.1 |
| 2014/0307433 A1* | 10/2014 | Kim | F21V 7/04 |
| | | | 362/235 |

* cited by examiner

OPTICAL ELEMENT AND BACKLIGHT UNIT INCLUDING THE SAME

CROSS-REFERENCE TO RELATED APPLICATION

This application claims the benefit under 35 U.S.C. § 119 of Korean Patent Application No. 10-2014-0043068, filed Apr. 10, 2014, which is hereby incorporated by reference in its entirety.

BACKGROUND

Field of the Invention

The present invention relates to an optical element for controlling light emitted from a light-emitting device.

Discussion of Related Art

The liquid crystal displays (LCDs) are devices in which electrical data generated from various devices are converted into visual data and transferred using the variation of liquid crystal transmittance according to the applied voltage.

The LCD, which does not have self light-emitting, provides backlight units (BLUs) which are light-emitting devices providing light on the back face of the liquid crystal panel on which images are displayed.

The BLU may be classified into an edge type and a direct type according to locations of the light-emitting diodes (LEDs) which are light sources.

In the edge type BLU, the LEDs which are the light sources are disposed on side faces of the light guide plate, and the light guide plate guides light emitted from the LEDs toward the liquid crystal panel through the total reflection, etc.

In the direct type BLU, the diffusion plate is used instead of the light guide plate, and the LEDs are disposed on the back face of the liquid crystal panel. Therefore, the LEDs emit light toward the back face of the liquid crystal panel.

Meanwhile, illumination uniformity in the LCD is an importance factor in determining the quality of the LCD, and to this end, the BLU should uniformly emits the light toward the liquid crystal panel.

BRIEF SUMMARY

The present invention is directed to an optical element having improved illumination uniformity, and a backlight unit including the same.

According to an aspect of the present invention, there is provided an optical element including: a light transmitting substrate including one face and the other face; a plurality of reflective lenses formed to protrude from the one face of the light transmitting substrate; and a scattering pattern formed on the one face of the light transmitting substrate and in an area between the plurality of reflective lenses.

According to another aspect of the present invention, there is provided a backlight unit including: a driving substrate; a plurality of light-emitting devices disposed on the driving substrate; and an optical element disposed on the light-emitting devices. The optical element includes: a light transmitting substrate including one face and the other face; a plurality of reflective lenses formed to protrude from the one face of the light transmitting substrate so as to correspond to the plurality of light-emitting devices, respectively; and a scattering pattern formed on the one face of the light transmitting substrate and in an area formed between the plurality of reflective lenses.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another. For example, a second element could be termed a first element, and, similarly, a first element could be termed a second element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings. In order to facilitate overall understanding of the invention, like reference numerals in the drawings denote like elements, and thus the description thereof will not be repeated.

Figure 1:
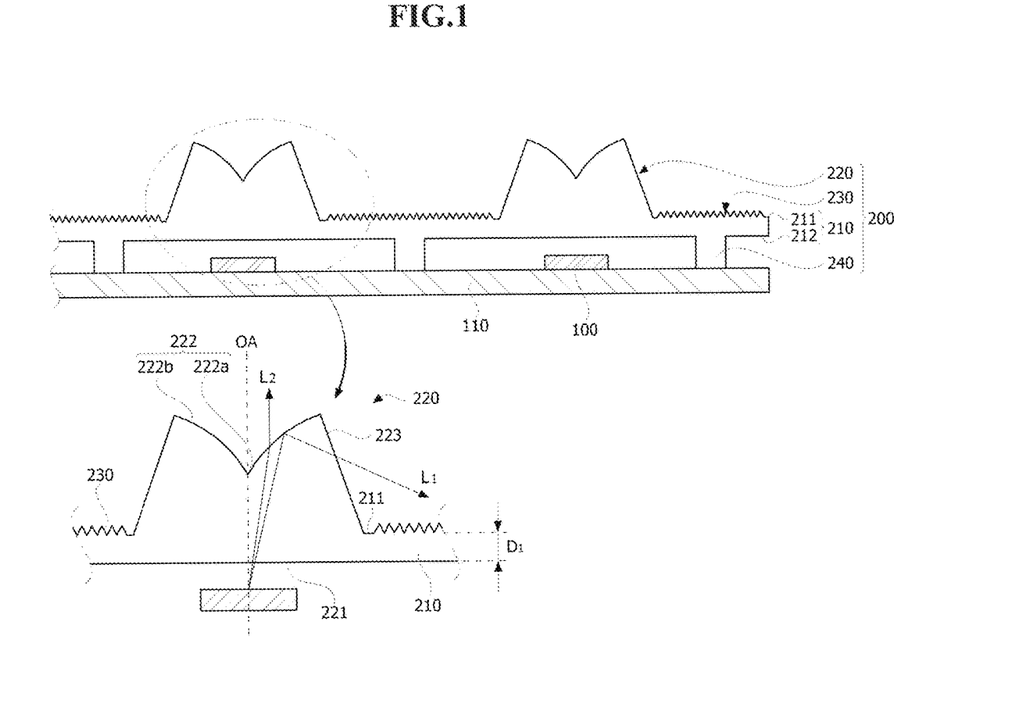
FIG. 1 is a conceptual view showing a configuration in which an optical element according to an exemplary embodiment of the present invention is disposed on a driving substrate.
Figure 2:
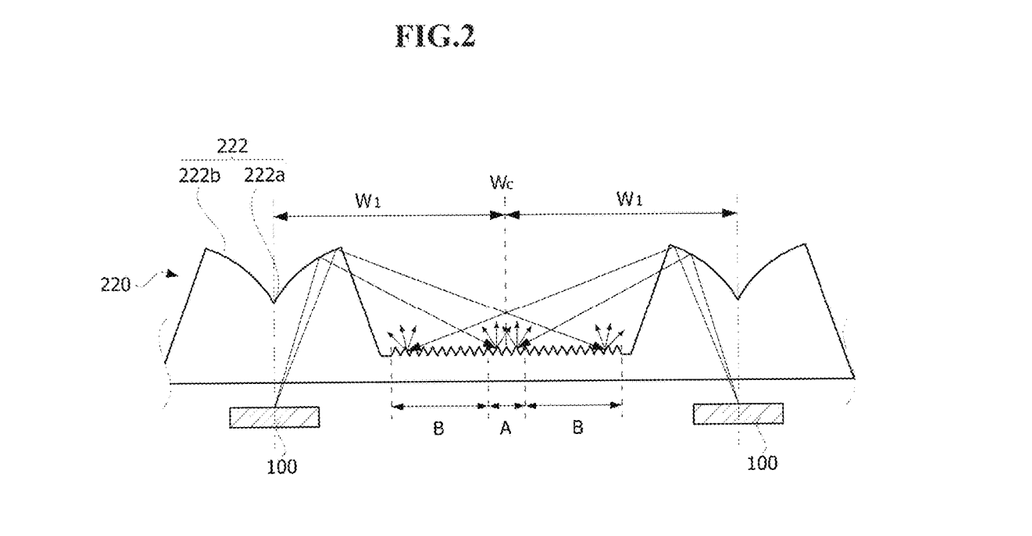
FIG. 2 is a view for describing a process in which light is diffused by an optical element according to an exemplary embodiment of the present invention.
Figure 3:
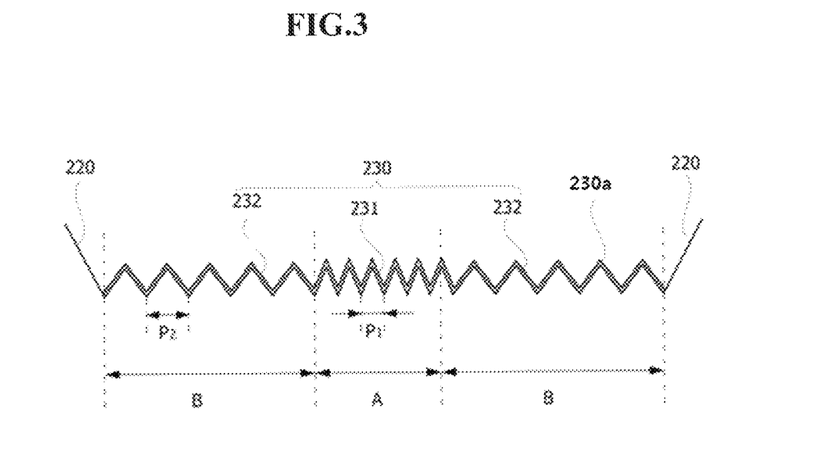
FIG. 3 is an enlarged view showing a scattering pattern according to an exemplary embodiment of the present invention.

FIG. 1 is a conceptual view showing a configuration in which an optical element according to an exemplary embodiment of the present invention is disposed on a driving substrate, FIG. 2 is a view for describing a process in which light is diffused by the optical element according to the exemplary embodiment of the present invention, and FIG. 3 is an enlarged view showing a scattering pattern according to the exemplary embodiment of the present invention.

Referring to FIG. 1, the optical element 200 according to the exemplary embodiment of the present invention includes a light transmitting substrate 210 including one face 211 and the other face 212, a plurality of reflective lenses 220 formed to protrude from the one face 211 of the light transmitting substrate 210, and a scattering pattern 230 formed in areas between the plurality of reflective lenses 220.

The light transmitting substrate 210 may be manufactured to have a size in which the plurality of reflective lenses 220 are disposed and to have a size equal to a driving substrate 110 on which light-emitting devices 100 are disposed. The light transmitting substrate 210 may be manufactured by curing the resin of a transparent material.

A thickness $D_1$ of the light transmitting substrate 210 may be in a range of 0.1 mm to 10 mm. Since the light transmitting substrate 210 is disposed on the driving substrate 110 by supporting parts 240, there is a problem that a sufficient strength cannot be maintained when the thickness thereof is less than 0.1 mm, and there is a problem that the optical element 200 cannot be disposed in a space allowed in backlights when the thickness thereof is more than 10 mm.

The plurality of reflective lenses 220 is formed to protrude from the one face 211 of the light transmitting substrate 210. The reflective lenses 220 may be integrally formed with the light transmitting substrate 210 by an injection molding. The reflective lenses 220 are formed at locations corresponding to the plurality of light-emitting devices 100, respectively.

The reflective lens 220 includes a first optical face 221 in which light emitted from the light-emitting device 100 is incident, a second optical face 222 facing the first optical face 221, and a third optical face 223 which connects the second optical face 222 to the one face 211 of the light transmitting substrate 210.

The reflective lens 220 may be defined as a lens in which some of the incident light is reflected by side faces (e.g., the third optical face of the embodiment of the present invention) and thus an area covered by one light-emitting device 100 is increased. The reflective lens 220 may reflect some of the light which is incident on the second optical face 222 to the third optical face 223, or some of the light which is incident on the third optical face 223 to the second optical face 222. Therefore, illumination uniformity may be increased.

The first optical face 221 may be the other face 212 of the light transmitting substrate 210 and a light incident face to which the light is incident. The first optical face 221 may have a planar face or a curved face.

The second optical face 222, which is a ceiling face disposed to be separated from the first optical face 221, may control a path of the light by reflecting some of the incident light to the third optical face 223. The second optical face 222 may include a central part 222a caved toward the first optical face 221, and a curved part 222b which connects the central part 222a and the one face 211 of the light transmitting substrate 210.

The curved part 222b may reflect light $L_1$ to the third optical face 223 when an angle between a progressing path and an optical axis OA is a predetermined value or more, and may transmit light $L_2$ when the angle between the progressing path and the optical axis OA is less than the predetermined value. The light reflected to the third optical face 223 is scattered by the scattering pattern 230. The curved part 222b may have an appropriate curvature in order to have required transmittance.

The scattering pattern 230 is formed on the one face 211 of the light transmitting substrate 210 and in the areas between the plurality of reflective lenses 220. The scattering pattern 230 scatters the light emitted from the reflective lens 220, and thus improves illumination uniformity. Therefore, when the optical element 200 of the embodiment of the present invention is used, there is an advantage that the illumination uniformity can be uniformly maintained without any additional diffusion sheets.

Referring to FIG. 2, two adjacent reflective lenses 220 emit the light toward the scattering pattern 230 located therebetween. In this case, the light is mostly concentrated in a central area A between the adjacent reflective lenses 220. The scattering pattern 230 may be formed so that a density of the central area A is greater than those of edge areas B.

Therefore, plenty of scattering occurs in the central area A in which an amount of light is large, and thus the central area A may be controlled so that the amount of light is similar to that of surroundings. Here, the central area A may be defined as an area including a center $W_c$ of a distance between the reflective lenses 220.

Referring to FIG. 3, pitches $P_1$ of a first scattering pattern 231 formed in the central area A may be formed to be smaller than pitches $P_2$ of a second scattering pattern 232 formed in the edge areas B. The scattering pattern 230 may be formed so that widths of the pitches are gradually increased from the central area A to the edge areas B.

The scattering pattern 230 may be formed in a random shape of which the pitches are non-uniform. That is, when a density of the first scattering pattern 231 formed in the central area A is greater than that of the second scattering pattern 232 formed in the edge areas B, illumination uniformity may be ensured.

An additional reflective layer 230a may be formed on the scattering pattern 230. Light reflectivity of the scattering pattern 230 may be increased by the reflective layer 230a and thus brightness may be increased.

A metal material of which reflectivity is high, such as silver (Ag), may be selected as the reflective layer 230a. The reflective layer 230a may have an irregular shape along the scattering pattern 230. Further, the reflective layer 230a may be formed only in the central area A in which the amount of light is large.

Figure 4:
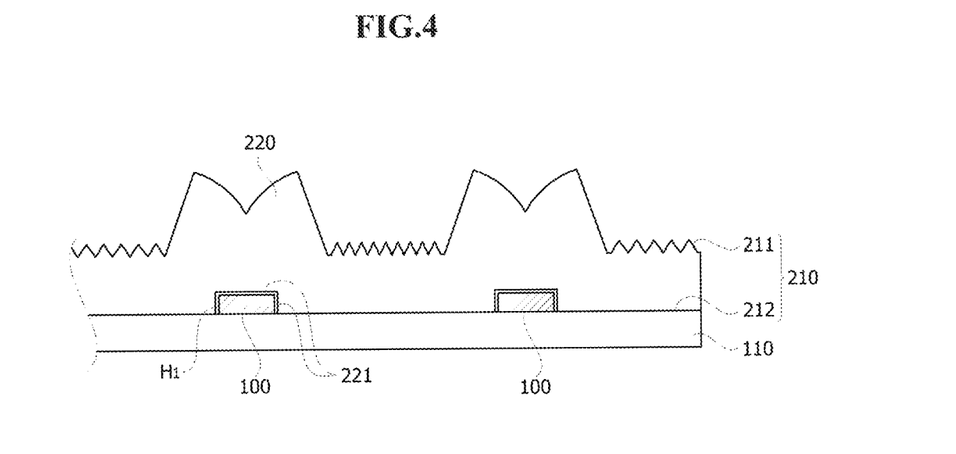
FIG. 4 is a view showing a modified example of an optical element according to an exemplary embodiment of the present invention.

FIG. 4 is a view showing a modified example of the optical element according to the exemplary embodiment of the present invention.

Referring to FIG. 4, grooves $H_1$ accommodating the light-emitting devices 100 may be formed in the first optical faces 221 of the reflective lenses 220. A height of the groove $H_1$ may be formed to be equal to or greater than that of the light-emitting device 100. According to this structure, the other face 212 of the light transmitting substrate 210 may be seated on an upper face of the driving substrate 110, and thus reliability may be improved.

Figure 5:
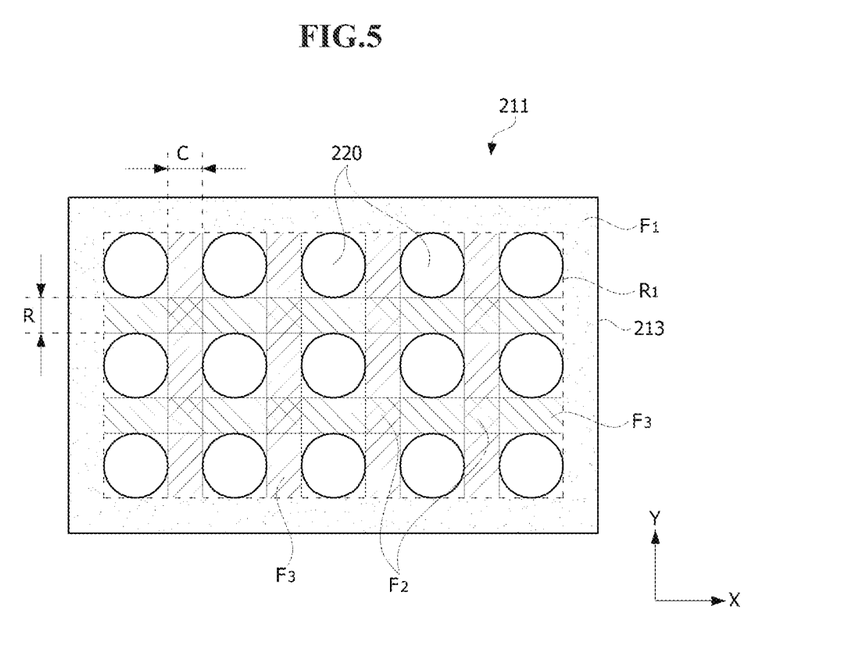
FIG. 5 is a plan view showing an optical element according to an exemplary embodiment of the present invention.
Figure 6:
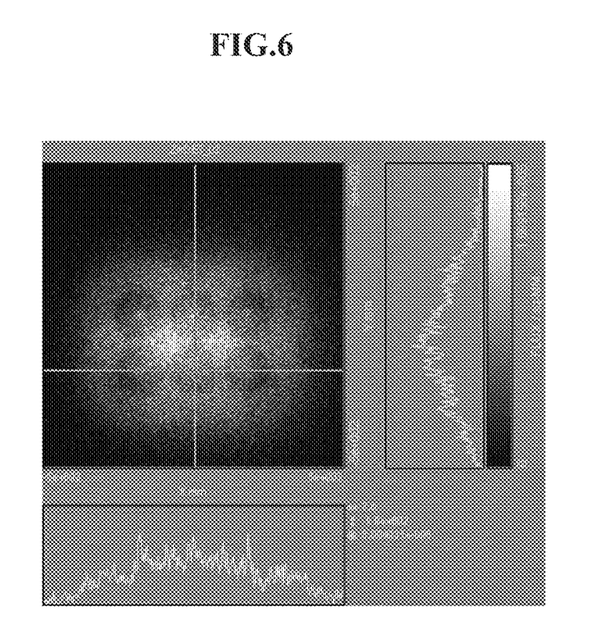
FIG. 6 is a view showing a measurement of a state of light which is diffused and controlled using an optical element according to an exemplary embodiment of the present invention.

FIG. 5 is a plan view showing the optical element according to the exemplary embodiment of the present invention, and FIG. 6 is a view showing a measurement of light which is diffused and controlled using the optical element according to the exemplary embodiment of the present invention.

Referring to FIG. 5, the one face 211 of the light transmitting substrate 210 includes a first area $F_1$ defined as an area between a minimum sized virtual rectangle $R_1$ including all of the plurality of reflective lenses 220 and edge areas 213 of the light transmitting substrate 210, a second area $F_2$ in which rows R and columns C which divide the plurality of reflective lenses 220 intersect, and a third area $F_3$ corresponding to the rows and columns except the second area $F_2$. The third area $F_3$ may be defined as a remaining area except the first area $F_1$ and the second area $F_2$.

Since the first area $F_1$, which is an edge area, has a relatively small amount of light, the first area $F_1$ may be formed so that a density of the scattering pattern 230 is small. The scattering pattern 230 may not be formed in the first area $F_1$ as necessary.

The second area $F_2$, which is an area in which the rows R and the columns C which divide the plurality of reflective lenses 220 intersect, may be defined as an area in which the light is mostly concentrated. Here, the rows R and the columns C have widths as much as a distance between the plurality of reflective lenses 220.

The third area $F_3$, which is a remaining area except the first area $F_1$ and the second area $F_2$, has the amount of light greater than the first area $F_1$, but the third area $F_3$ is the area having the amount of light relatively smaller than the second area $F_2$.

Therefore, when the density of the scattering pattern 230 formed in the first area $F_1$ to the third area $F_3$, in which the amount of light is different from each other, satisfies the following Relational Expression 1, it is possible to ensure the uniform illumination uniformity in a front face of the optical element 200 as shown in FIG. 6. Therefore, a diffusion sheet may be omitted from a backlight unit:

D2>D3>D1 [Relational Expression 1]

Here, D1 refers to a density of a scattering pattern in the first area $F_1$, D2 refers to a density of a scattering pattern in the second area $F_2$, and D3 refers to a density of a scattering pattern in the third area $F_3$.

Figure 7:
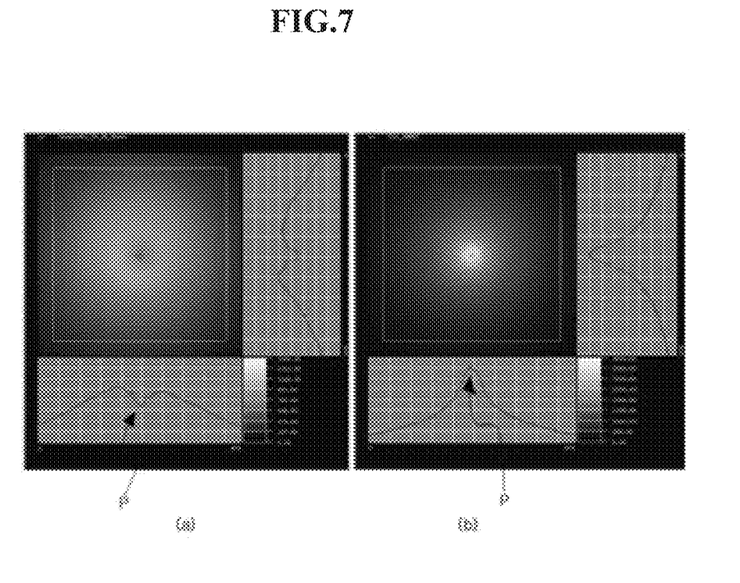
FIG. 7 is a view for describing an appropriate range of light transmittance of a reflective lens according to an exemplary embodiment of the present invention.

FIG. 7 is a view for describing an appropriate range of light transmittance of the reflective lens according to the exemplary embodiment of the present invention.

Light transmittance of the second optical face 222 of the reflective lens 220 may be adjusted in a range of 5% to 30% based on an amount of light of 100% incident on the second optical face 222. A cover (not shown) capable of adjusting the light transmittance may be disposed on the second optical face 222 of the reflective lens 220. The cover may be manufactured by curing a resin in which a material for controlling the light transmission control such as black carbon or the like is dispersed.

Referring to FIG. 7(A), when the light transmittance is less than 5%, there is a problem in that a dark area is observed in a center P of the reflective lens 220, and when the light transmittance is more than 30%, there is a problem in that a hot spot is generated in the center P of the reflective lens 220 as shown in FIG. 7(B). Therefore, when the light transmittance of the reflective lens 220 is adjusted in a range of 5% to 30%, illuminance similar to that of a periphery diffused by the scattering pattern may be provided.

Figure 8:
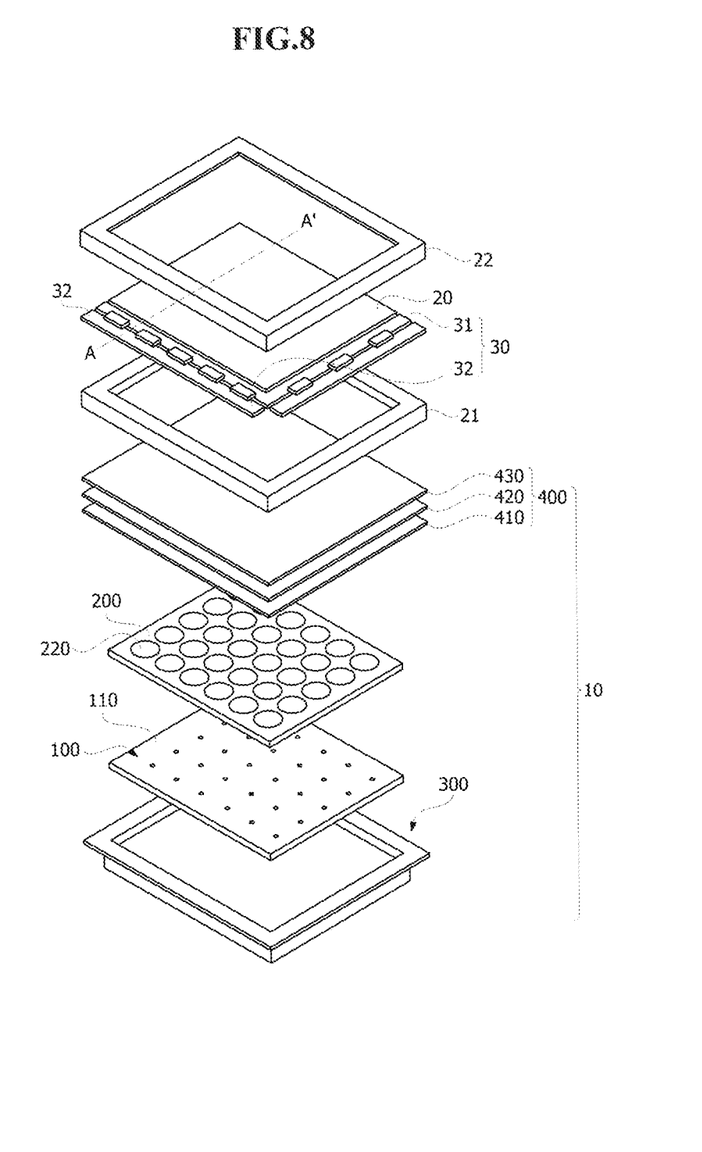
FIG. 8 is an exploded perspective view showing a liquid crystal display (LCD) according to an exemplary embodiment of the present invention.
Figure 9:
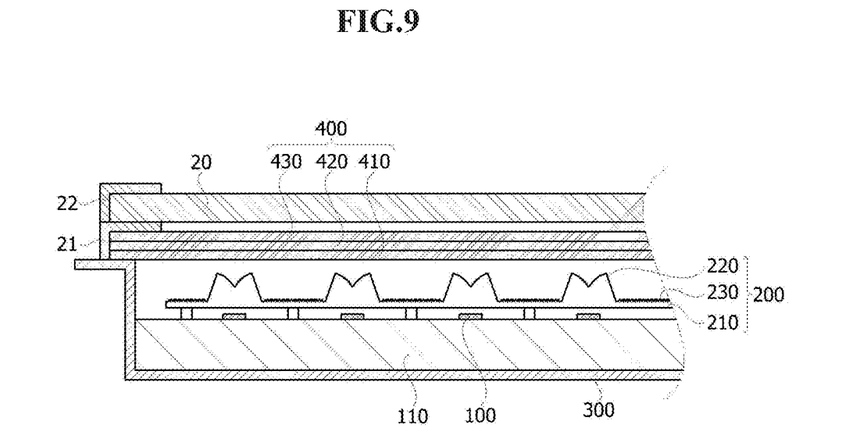
FIG. 9 is a cross-sectional view showing a backlight unit (BLU) taken along line A-A' of FIG. 8 according to an exemplary embodiment of the present invention.

FIG. 8 is an exploded perspective view showing a liquid crystal display (LCD) according to an exemplary embodiment of the present invention, and FIG. 9 is a cross-sectional view showing a backlight unit (BLU) taken along line A-A' of FIG. 8 according to the exemplary embodiment of the present invention.

Referring to FIGS. 8 and 9, the LCD includes the BLU 10 and a liquid crystal panel 20.

The liquid crystal panel 20, which is a display part of the LCD, may include a thin film transistor (TFT) substrate, a color filter substrate, and a liquid crystal layer interposed therebetween. The TFT substrate includes a plurality of gate lines, a plurality of data lines which intersect the plurality of gate lines, and a TFT formed at an intersection of each gate line and data line.

A driving circuit 30 may be connected to one side of the liquid crystal panel 20.

The driving circuit 30 includes a printed circuit board 31 which supplies a scanning signal to the gate line of the TFT substrate, and a printed circuit board 32 which supplies a data signal to the data line.

The driving circuit 30 is electrically connected to the liquid crystal panel 20 using a method such as a chip on film (COF) method, a tape carrier package (TCP) method, etc.

The LCD may further include a panel guide 21 which supports the liquid crystal panel 20, an upper case 22 which surrounds edges of the liquid crystal panel 20 and is coupled to the panel guide 21.

The BLU 10 may be coupled to the liquid crystal panel 20 in a direct type, and include a lower cover 300, a driving substrate 110, a plurality of light-emitting devices 100, an optical element 200 which controls light of the light-emitting device 100, and a plurality of optical sheets 400.

The lower cover 300 may be made of a metal or the like, and provided in a box shape of which an upper part opens. For example, the lower cover 300 may be formed with a bent metal plate, etc.

The driving substrate 110 is accommodated in a space formed with the bent lower cover 300. Further, the lower cover 300 may serve to support the optical sheets 400 and the liquid crystal panel 20.

The driving substrate 110 may have a plate shape, and a reflective layer may be formed on the driving substrate 110. The reflective layer may reflect light emitted from the light-emitting device 100, and serve to improve the performance of the BLU 10.

The plurality of light-emitting devices 100 may be mounted on the driving substrate 110. In each light-emitting device 100, light distribution is controlled by the optical element 200. In FIGS. 8 and 9, the case in which the light-emitting device 100 is a light-emitting diode (LED) is described as an example.

Each LED 100 is disposed on the driving substrate 110 and electrically connected to the driving substrate 110. The LED 100 emits light according to a driving signal supplied from the driving substrate 110.

Each LED 100 may operate as a point light source, and an array of the LEDs 100 disposed on the driving substrate 110 by a predetermined distance may form a face light source.

Each LED 100 may be provided in a light-emitting package form including LED chips. LEDs 100 may each emit white light, or may be evenly divided into blue light, green light, and red light to be emitted.

Since the optical element 200 is disposed on the driving substrate 110 and controls a speed and transmittance of light emitted from the LED 100, the optical element 200 may serve to improve luminance uniformity of the BLU 10.

The light transmitting substrate 210 is disposed on the light-emitting device 100 by supporting parts. When the light emitted from the LED 100 is incident, the reflective lens 220 integrally formed on the light transmitting substrate 210 may serve to control the light speed and improve luminance uniformity. Since detailed functions of the optical element 200 are the same as described above, further detailed descriptions thereof will be omitted.

The optical sheets 400 may include a diffusion sheet 410, a first prism sheet 420, and a second prism sheet 430, and may be used to improve characteristics of light passing through the optical sheets 400.

The diffusion sheet 410 guides light incident from the light source 100 toward a front face of the liquid crystal panel 20, diffuses the light so as to have a uniform distribution in a wide range, and then guides the light to the liquid crystal panel 20. However, as described above, when the illumination uniformity is sufficiently maintained by the optical element 200, the diffusion sheet 410 may be omitted.

The first prism sheet 420 and the second prism sheet 430 are disposed to be intersected with each other, collect again the diffused light, and guide the collected light to the liquid crystal panel 20.

According to the embodiments of the present invention, a lens and a scattering pattern are integrally formed, and thus illumination uniformity can be ensured. Therefore, a diffusion sheet can be omitted.

While the present invention has been described with reference to the exemplary embodiments, it should be understood by those skilled in the art that various changes and modifications may be made herein without departing from the scope of the present invention as defined by the appended claims.

What is claimed is:

1. An optical element comprising:
a light transmitting substrate including a first face and a second face opposite from the first face;
a plurality of reflective lenses integrally formed on the light transmitting substrate, wherein the plurality of reflective lenses protrudes from the first face of the light transmitting substrate;
a scattering pattern formed on the first face of the light transmitting substrate and in an area between the plurality of reflective lenses; and
a plurality of supporting parts formed to protrude from the second face of the light transmitting substrate;
wherein the supporting parts protrude in a first direction, and the first direction is opposite to a second direction in which the reflective lenses protrude;
wherein a density of the scattering pattern is greatest in a central area between adjacent reflective lenses;
wherein the supporting parts are disposed on the central area between adjacent reflective lenses;
wherein the light transmitting substrate, the plurality of reflective lenses, and the plurality of supporting parts comprise a same material, which is transparent; and
wherein a thickness of each supporting part is greater than a thickness of the light transmitting substrate.

2. The optical element of claim 1, wherein each lens of the plurality of reflective lenses comprises:
a first optical face;
a second optical face configured to face the first optical face; and
a third optical face configured to connect the second optical face to the first face of the light transmitting substrate,
wherein the second optical face reflects some of incident light toward the scattering pattern, and
wherein the second optical face includes a central part caved toward the first optical face and a curved part that connects the central part and the first face of the light transmitting substrate.

3. The optical element of claim 1, wherein the first face of the light transmitting substrate comprises:
a first area defined as an area between a minimum sized virtual rectangle including all of the plurality of reflective lenses and edges of the light transmitting substrate;
a second area in which rows and columns that divide the plurality of reflective lenses intersect; and
a third area defined as a remaining area except the first area and the second area, and
wherein a density of the scattering pattern formed in the first area to the third area satisfies the following Relational Expression 1:

$$D2>D3>D1 \quad \text{[Relational Expression 1]}$$

where D1 refers to a density of a scattering pattern in the first area, D2 refers to a density of a scattering pattern in the second area, and D3 refers to a density of a scattering pattern in the third area.

4. The optical element of claim 1, further comprising a reflective layer formed on the scattering pattern, wherein widths of pitches of the scattering pattern are gradually increased from the central area to an edge area.

5. The optical element of claim 1, wherein the thickness of the light transmitting substrate is in a range of 0.1 mm to 10 mm.

6. A backlight unit (BLU) comprising:
a driving substrate;
a plurality of light-emitting devices disposed on the driving substrate; and
an optical element disposed on the light-emitting devices, wherein the optical element comprises:
a light transmitting substrate including a first face and a second face opposite from the first face;
a plurality of reflective lenses formed to protrude from the first face of the light transmitting substrate so as to correspond to the plurality of light-emitting devices, respectively;
a scattering pattern formed on the first face of the light transmitting substrate and in an area formed between the plurality of reflective lenses; and
a plurality of supporting parts fainted to protrude from the second face of the light transmitting substrate;

wherein the supporting parts protrude in a first direction, and the first direction is opposite to a second direction in which the reflective lenses protrude;

wherein a density of the scattering pattern is greatest in a central area between adjacent reflective lenses;

wherein the light transmitting substrate is disposed on the plurality of light-emitting devices;

wherein the supporting parts are disposed in the central area between adjacent reflective lenses; and wherein a thickness of each supporting part is greater than a thickness of the light-emitting device.

7. The BLU of claim 6, wherein each lens of the plurality of reflective lenses comprises:

a first optical face configured to incident light emitted from the light-emitting device;

a second optical face configured to face the first optical face; and a third optical face configured to connect the second optical face to the first face of the light transmitting substrate, wherein the second optical face reflects some of the incident light toward the scattering pattern, wherein the second optical face includes a central part caved toward the first optical face and a curved part that connects the central part and the first face of the light transmitting substrate.

8. The BLU of claim 6, wherein the first face of the light transmitting substrate comprises:

a first area defined as a minimum sized rectangle including all of the plurality of reflective lenses and an area between edges of the light transmitting substrate;

a second area in which rows and columns that divide the plurality of reflective lenses intersect; and a third area defined as a remaining area except the first area and the second area, and wherein a density of the scattering pattern formed in the first area to the third area satisfies the following Relational Expression 1:

$$D2>D3>D1 \qquad \text{[Relational Expression 1]}$$

where D1 refers to a density of a scattering pattern in the first area, D2 refers to a density of a scattering pattern in the second area, and D3 refers to a density of a scattering pattern in the third area.

9. The BLU of claim 6, further comprising a reflective layer formed on the scattering pattern, wherein widths of pitches of the scattering pattern are gradually increased from the central area to an edge area.

10. The BLU of claim 6, wherein the thickness of the light transmitting substrate is in a range of 0.1 mm to 10 mm.

* * * * *